United States Patent [19]
Bruno

[11] Patent Number: 5,537,680
[45] Date of Patent: Jul. 16, 1996

[54] CELLULAR RECEIVER RANGE EXTENDER

[75] Inventor: Saverio T. Bruno, Danbury, Conn.

[73] Assignee: Insulated Wire Incorporated, Ronkonkoma, N.Y.

[21] Appl. No.: 364,311

[22] Filed: Dec. 27, 1994

[51] Int. Cl.$^6$ .................................................. H04B 7/14
[52] U.S. Cl. .......................... 455/15; 455/76.1; 455/76.5; 455/303; 330/306; 330/286
[58] Field of Search .................... 455/33.1, 67.1, 455/54.1, 67.5, 15, 226.1, 232.1, 249.1, 250.1, 254, 273, 280, 62, 266, 303, 306, 338, 339; 330/306, 286

[56] References Cited

U.S. PATENT DOCUMENTS

| | | | |
|---|---|---|---|
| 3,737,799 | 6/1973 | Stander | 455/306 |
| 3,911,366 | 10/1975 | Baghdady | 455/303 |
| 3,988,679 | 10/1976 | Clarke et al. | 455/306 |
| 4,668,920 | 5/1987 | Jones | 330/286 |
| 4,679,248 | 7/1987 | McKeown | 455/226.1 |
| 4,742,561 | 5/1988 | Tipton | 455/67.1 |

Primary Examiner—Edward F. Urban
Assistant Examiner—Lee Nguyen
Attorney, Agent, or Firm—Parmelee, Bollinger & Bramblett; G. Kendall Parmelee

[57] ABSTRACT

A cellular receiver range extender has an input terminal connectable to an antenna and an output terminal to which may be connected a microwave radio receiver for cellular communication signals. The input terminal directs RF signals to a bandpass preselector covering a frequency spectrum of 825 MHz to 890 MHz leading to a low-noise preamplifier for amplifying the preselected RF signals. A divider coupled to the preamplifier feeds signals from the preamplifier at equal power levels into first and second RF paths. The first path includes a band pass filter covering the reverse cellular communication channel RF signal band from 825 MHz to 845 MHz, and the second path includes a band pass filter covering the forward cellular communication channel RF signal band from 870 MHz to 890 MHz. In the first path reverse channel signals are amplified by a low-noise amplifier while in the second path forward channel signals are attenuated. Thus, the power levels of reverse and forward channel signals are suitably substantially equalized by a power gain of at least about 10 times for reverse channel signals relative to forward channel signals. The first and second paths lead to a combiner which recombines the equalized reverse and forward channel signals. A low-noise output amplifier serves to amplify the recombined signals and directs them to the output terminal for use by a microwave radio receiver for cellular communications which may be connected to that output.

16 Claims, 4 Drawing Sheets

| FIG. 2A | FIG. 2B | FIG. 2C |

CELLULAR RECEIVER RANGE EXTENDER

FIELD OF THE INVENTION

This invention relates to the field of cellular communications. More particularly, this invention relates to a range extender for use with a receiver of cellular transmissions for extending the range over which such a receiver is capable of suitably receiving microwave transmissions both from relatively powerful fixed station cell transmitters and also from relatively weak cellular phone transmitters.

BACKGROUND

There is a natural difference between the energy levels of microwave transmissions from fixed station cell transmitters and from cellular phone transmitters. Fixed station cell transmitters have significantly higher power and considerably larger and better antennas than possible with cellular phone transmitters.

Fixed cell sites operate over the 870–890 MegaHertz (MHz) band (called the "forward" channels) while cellular phone units operate over the 825–845 MHz band (called the "reverse" channels).

A result of the large differences in energy levels of the respective signals from fixed station cell transmitters and cellular phone transmitters is that in many situations a receiver which is monitoring such transmissions can easily receive cellular base station radio frequency (RF) signals (herein called "forward channel RF signals" or "forward channel signals" or similar wording) but cannot receive adequate energy levels of radio frequency signals from cellular phone transmitters (herein called "reverse channel RF signals" or "reverse channel signals" or similar wording).

SUMMARY

It is a purpose of this range extender for use with a receiver of cellular transmissions to equalize or substantially equalize the RF signal energy levels of forward channel signals and reverse channel signals for significantly extending the range over which the receiver can receive forward and reverse channel signals at suitable and adequate energy levels.

In a preferred embodiment of the present invention to be described below in detail, a range extender for use with a cellular transmissions monitoring receiver has an input connection for an antenna and an output connection for the receiver. The range extender divides signals coming in through the input connection into first and second RF paths. This operation begins by first preselecting RF signals which have entered through the input connection for causing the preselected signals to cover the cellular band frequency spectrum of 825 MHz to 890 MHz. The resulting preselected band of RF signals is routed to a low-noise preamplifier. The output of the low-noise preamplifier then is divided equally, i.e., at substantially equal power levels, and the resulting equally divided RF signals are fed into first and second RF paths as indicated above. The first RF path carries reverse channel signals and covers the reverse channel frequency band of 825 MHz to 845 MHz. The second RF path carries forward channel signals and covers the forward channel frequency band of 870 MHz to 890 MHz. In the first path the reverse channel signals are amplified while in the second path the forward channel signals are attenuated, thereby equalizing or substantially equalizing power levels of both reverse and forward channel RF signals. Both paths are then recombined, and the recombined forward and reverse channel RF signals are amplified and are fed to the output connection for these signals to be available for a monitoring receiver which may be connected to or plugged into the output connection.

Further summarizing a preferred embodiment of the present invention, a cellular receiver range extender has an input terminal connectable to an antenna and an output terminal connectable to a microwave radio receiver. A bandpass preselector has a passband for the cellular band of RF signals and covers the frequency spectrum of 825 MHz to 890 MHz. This preselector is coupled to the input terminal. A low-noise preamplifier is coupled to the bandpass preselector for amplifying RF signals within the cellular band. A power divider is coupled to the preamplifier for feeding signals from the preamplifier at equal power levels into first and second RF paths. The first path includes bandpass filter means which cover the reverse channel RF signal band from 825 MHz to 845 MHz, and the second path includes bandpass filter means which cover the forward channel RF signal band from 870 MHz to 890 MHz. Amplification means are provided for reverse channel signals in the first path, and attenuation means are provided for forward channel signals in the second path. Thus, the power levels of the reverse and forward channel signals are suitably substantially equalized. A power combiner is coupled to the first and second paths for recombining the suitably equalized reverse and forward channel signals which have travelled, respectively, through the first and second paths. An output amplifier is coupled between the power combiner and the output terminal for providing amplified and suitably equalized reverse and forward channel signals available at the output terminal for a microwave radio receiver which may be connected to the output terminal.

It is understood that in actual practice a bandpass filter device does not provide an abrupt (sharp) cutoff at the lower and upper ends of the band or spectrum of frequencies which are desired to be passed through the filter. Instead, the filter will exhibit a roll-off in its pass characteristics at the lower and upper ends of its nominal passband. Thus, for example, a filter which "covers" or is "covering" a desired passband of frequencies extending nominally from 870 MHz to 890 MHz may be designed actually to pass RF signals throughout a slightly wider range of frequencies, for example extending from about 868 MHz to about 894 MHz. Also a filter which "covers" or is "covering" a desired passband of frequencies extending nominally from 825 MHz to 845 MHz may be designed actually to pass RF signals throughout a slightly wider range of frequencies, for example extending from about 823 MHz to about 849 MHz.

BRIEF DESCRIPTION OF THE DRAWINGS

The cellular receiver range extender invention, together with further objects, features, advantages and aspects thereof, will be more clearly understood from the following detailed description considered in conjunction with the accompanying drawings. Like reference numerals indicate like elements or like components throughout the different views.

The accompanying drawings, which are incorporated in and constitute a part of the specification, illustrate a presently preferred embodiment of the invention in a range extender for use with a receiver of cellular transmissions and, together with the general description set forth above and the detailed description of the preferred embodiment set forth below, serve to explain the principles of the invention. In these drawings.

DETAILED DESCRIPTION OF A PREFERRED EMBODIMENT

Figure 1:
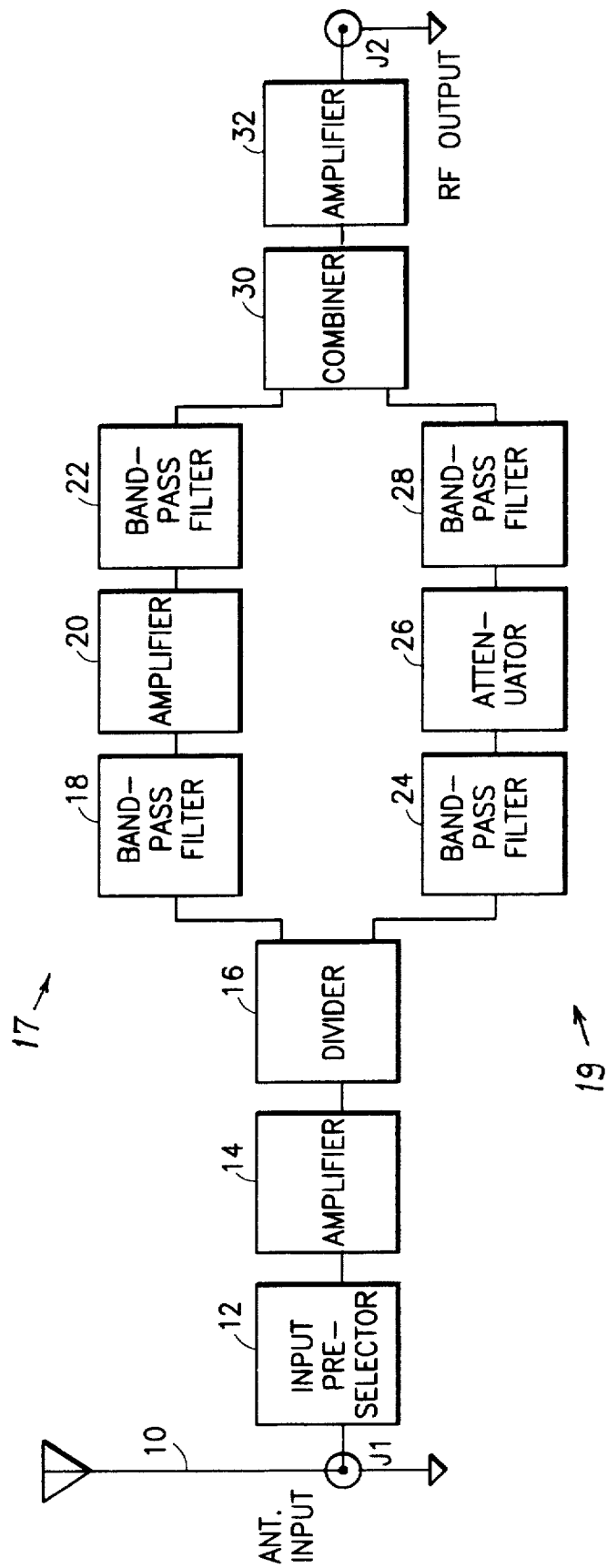
FIG. 1 is a functional block diagram of a cellular communications receiver range extender shown as a preferred embodiment of the present invention for use with a receiver of both forward and reverse channel RF transmissions covering the cellular band of 825 MHz to 890 MHz.

The drawing FIG. 1 illustrates a range extender for use with a receiver of cellular transmissions for significantly extending the range at which the receiver will suitably receive both reverse channel and forward channel cellular transmissions. This range extender has an RF input terminal J1, for example a threaded nut coupling (TNC) connector, to which an antenna 10 is shown connected. There is an RF output terminal J2 to which may be plugged the input of a radio receiver for cellular transmissions. Incoming RF signals entering at input terminal J1 are preselected by an input preselector 12 for selecting signals to cover the cellular band extending from 825 MHz to 890 MHz. The resulting preselected band of cellular RF signals is fed into a low-noise preamplifier 14. For example this preamplifier may be a Gallium Arsenide (GaAs) Field Effect Transistor (FET) low-noise amplifier providing about 14 dB of power gain with less than a 1 dB noise figure. The output of this preamplifier 14 is equally divided by a resistive divider 16 which directs the resulting RF signals at substantially equal power levels into first and second RF signal paths 17 and 19 respectively.

At the input of the first RF path 17 is a bandpass filter 18 which covers the reverse channel band of frequencies extending from 825 MHz to 845 MHz. Reverse channel signals passing through the filter 18 are directed to an amplifier 20, for example another GaAs FET low-noise amplifier providing about 14 dB of power gain with less than a 1 dB noise figure. The output from the amplifier 20 is filtered by another bandpass filter 22 similar to the bandpass filter 18. The resulting bandpass filtered and amplified reverse channel signals which have travelled through the RF signal path 17 are directed from the output of the bandpass filter 22 to a combiner 30, for example a resistive combiner.

At the input of the second RF signal path 19 is a bandpass filter 24 which covers the forward channel band of frequencies extending from 870 to 890 MHz. The forward channel signals passed through this filter 24 are directed to a resistive attenuator 26, for example providing about 6 dB reduction in signal power. The output from this attenuator 26 is filtered by another bandpass filter 28 similar to the bandpass filter 24. The resulting bandpass-filtered and attenuated forward channel signals which have travelled through the RF signal path 19 are directed to the combiner 30 for recombining of forward channel signals output from path 19 and reverse channel signals output from path 17.

The recombined forward and reverse channel signals output from combiner 30 are directed through an output amplifier 32 to an output terminal J2, for example a TNC connector to which may be connected a suitable cellular transmissions monitoring receiver. The output amplifier 32 may, for example be a third GaAs FET amplifier having characteristics similar to those of the amplifiers 14 and 20.

It is noted again that in the above-described preferred embodiment of the invention the path 17 for the reverse channel signals provides amplification of about 14 dB whereas the path 19 for the forward channel signals provides attenuation of about 6 dB, thereby providing a net difference nominally of about 20 dB between such gain and reduction in signal power. This difference of about 20 dB in signal power represents a power ratio of about one hundred. In other words, the reverse channel signals have been strengthened in power by about 100 times relative to the forward channel signals.

Figures 2, 2A:
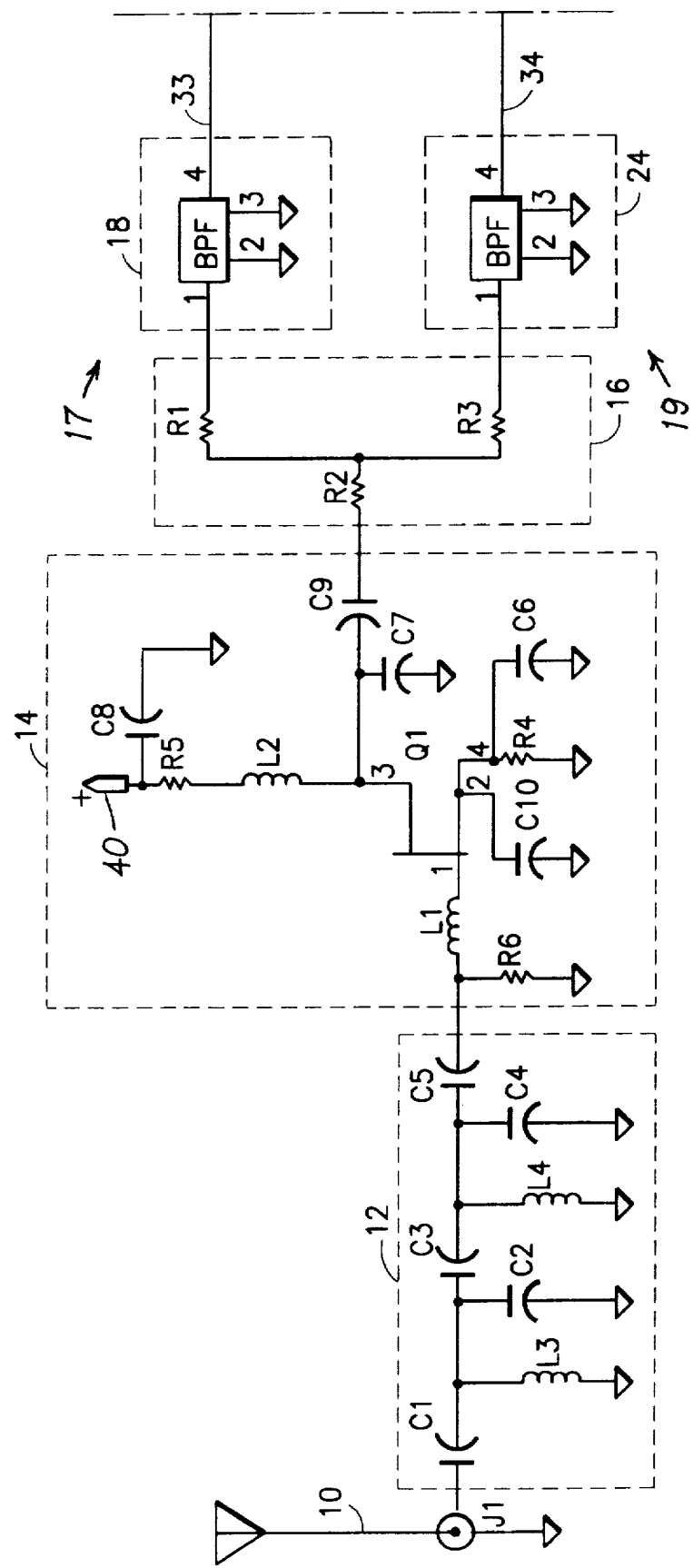
FIG. 2 is a diagram illustrating intended relative positioning of FIGS. 2A, 2B and 2C.
FIGS. 2A, 2B and 2C are schematic circuit diagrams of the cellular receiver range extender shown in FIG. 1. These FIGS. 2A, 2B and 2C respectively show circuitry of an input portion, an intermediate portion and an output portion of this preferred embodiment of the present invention.
Figure 2B:
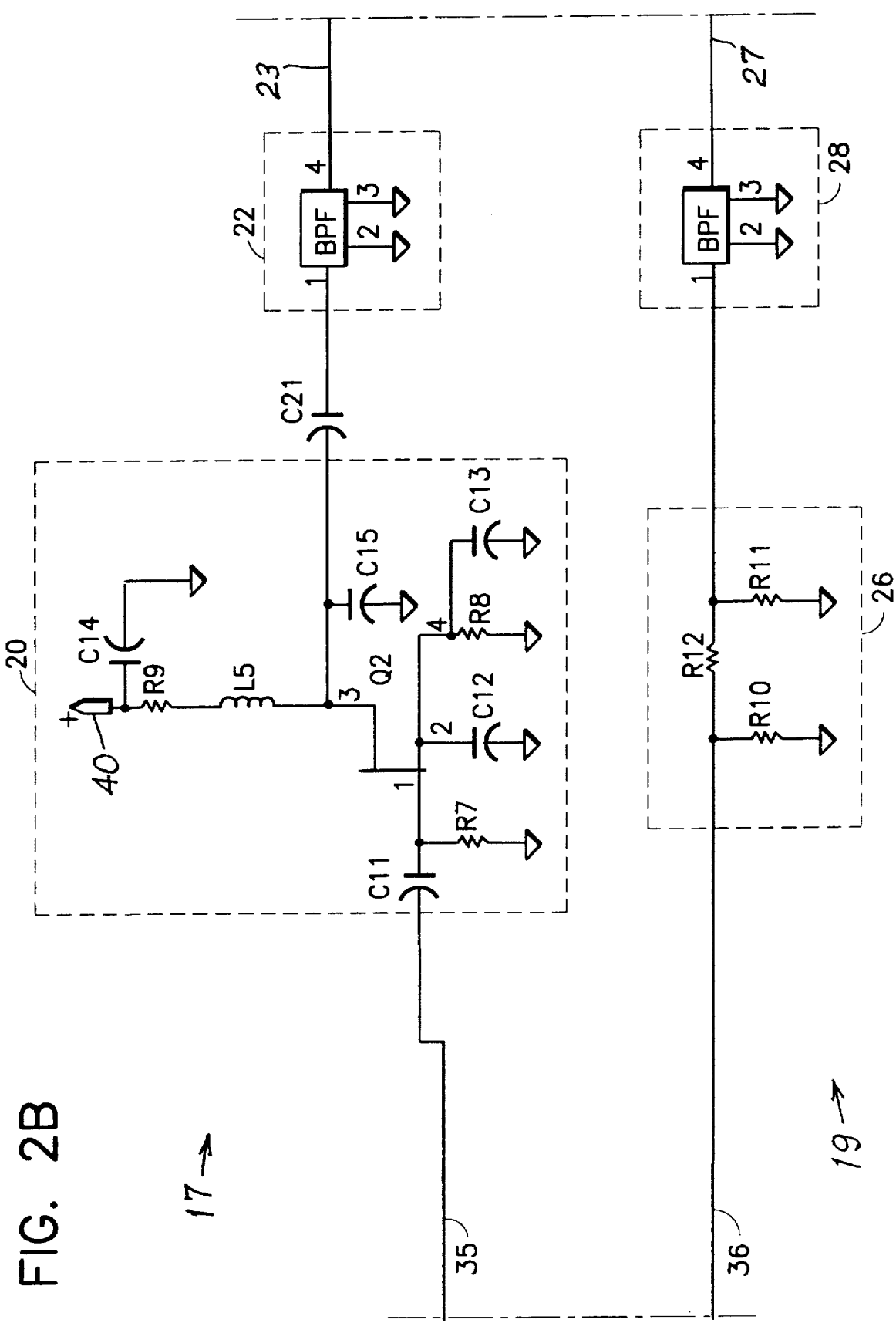
Figure 2C:
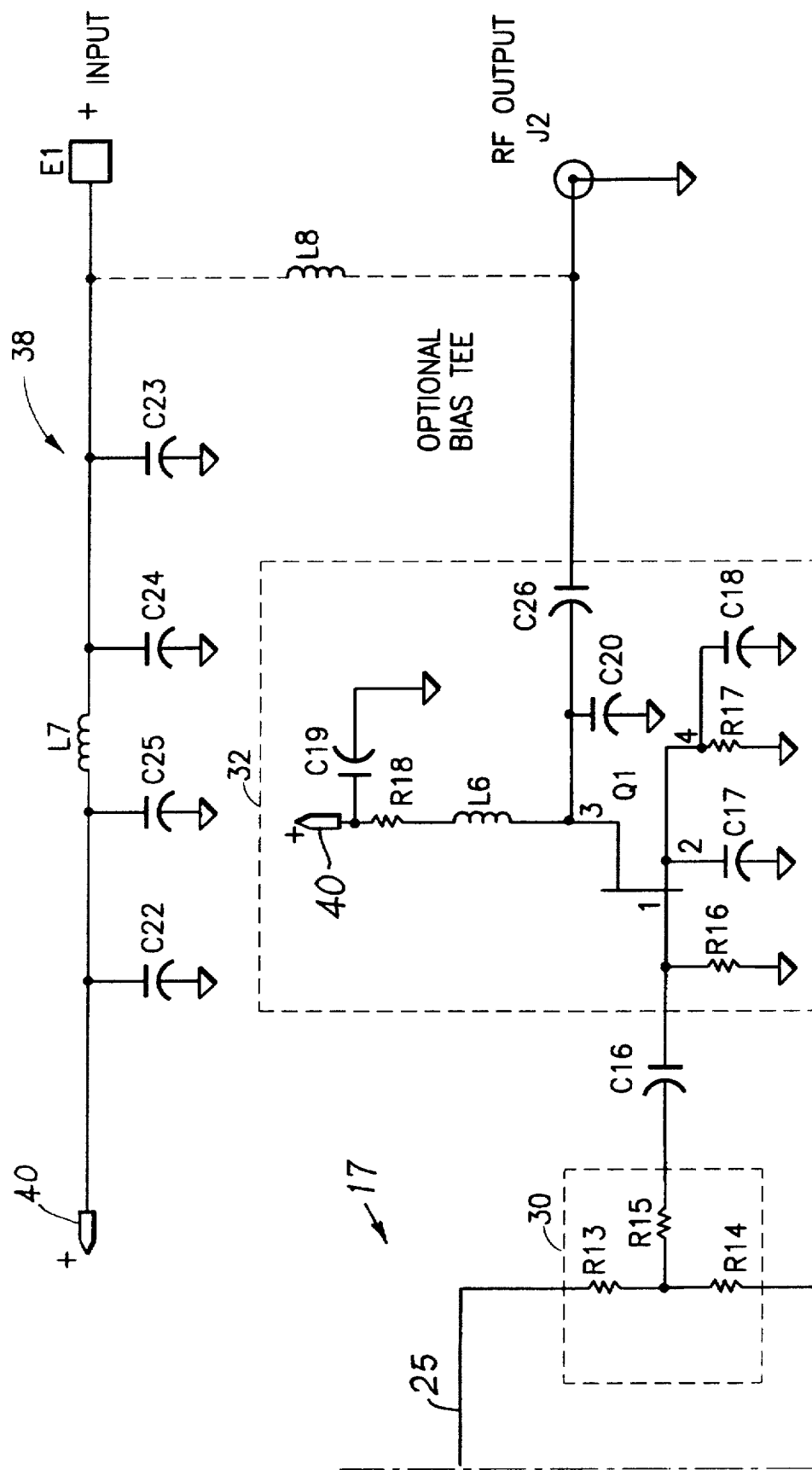

Moreover, to be explained below in detail, this cellular range extender shown in FIG. 1 and in FIGS. 2A, 2B and 2C provides at its output terminal J2 reverse and forward channel signals which have been amplified, respectively, by about 24 dB and about 4 dB, thereby significantly enhancing reception of both signals for a receiver plugged into the output connector J2.

Examples are set forth below in a Table of commercially available items and electrical parameters of components which are suitable to be incorporated in the circuitry of the presently preferred embodiment of the cellular receiver range extender shown in FIGS. 2A, 2B and 2C. The preselector bandpass filter 12 (FIG. 2A) is shown as a two-section filter which causes a reduction in signal power of about 2 dB. The preamplifier 14 is shown incorporating a low-noise GaAs FET amplifier chip Q1. The characteristics of this preamplifier 14 are described above providing a gain of about 14 dB in signal power with less than a 1 dB noise figure. The two-path divider 16 is a resistive equal-power divider which diminishes power by about 6 dB of signals respectively fed into the two RF paths 17 and 19 (FIG. 1).

In the first RF path 17 the bandpass filter 18 is shown as a 3-pole ceramic bandpass filter having a passband centered at about 836 MHz. This passband extends plus and minus about 12.5 MHz above and below the center frequency, namely from about 823.5 MHz (nominally about 823 MHz) to about 848.5 MHz (nominally about 849 MHz). This bandpass filter 18 introduces a power loss of about 2 dB, and its output is directed through connection path 33–35 to the amplifier 20. This amplifier 20 for the reverse channel signals may be identical to the preamplifier 14, and thus it provides about 14 dB of power gain with less than a 1 dB noise figure. For example it is shown incorporating a low-noise GaAs FET amplifier chip Q2. The reference Q2 is shown to indicate that this amplifier 20 is handling only reverse channel signals; whereas, preamplifier 14 is handling both forward and reverse channel signals. Coupled to the output of amplifier 20 is the bandpass filter 22, shown as a 3-pole ceramic bandpass filter identical to the bandpass filter 18. This filter 22 introduces a power loss of about 2 dB, and its output is directed through connection path 23–25 to the resistive combiner 30 wherein are recombined the reverse and forward channel signals which have travelled their respective paths 17 and 19. This resistive combiner introduces a signal power loss of about 6 dB for signals being combined therein.

In the second RF path 19 the bandpass filter 24 is shown as a 3-pole ceramic bandpass filter having a passband centered at about 881 MHz. This passband extends plus and minus about 12.5 MHz above and below the center frequency, namely from about 868.5 MHz (nominally about 868 MHz) to about 893.5 MHz (nominally about 894 MHz). This passband filter 24 causes a power loss of about 2 dB. Its output is directed through connection path 34–36 to the attenuator 26. This attenuator is shown as a 3-resistor pad providing a reduction in signal power of about 6 dB. At the output of the attenuator 26 is the bandpass filter 28, shown as a 3-pole ceramic bandpass filter identical with the filter 24 and causing a signal power loss of about 2 dB. The forward channel signals output from this filter 28 are directed through connection path 27–29 to the resistive combiner 30 for recombination with the reverse channel signals output from the filter 22. A signal power reduction of about 6 dB occurs in the combiner 30, and the resultant recombined signals are directed to the output amplifier 32.

This output amplifier 32 is shown identical to the preamplifier 14 and provides 14 dB of gain in signal power with a low-noise figure of less than 1 dB. Thus, the reverse channel signals are available at a power gain of about 24 dB at the output terminal J2, and the forward channel signals are available there at a power gain of about 4 dB, thereby providing a presently most preferred net difference nominally of about 20 dB in power gain of reverse channel signals relative to forward channel signals. As pointed out above, this power gain of about 20 dB represents a multiplication nominally of about one hundred times in the ratio of the power level of reverse channel signals relative to the power level of forward channel signals.

A preferred range for the difference of power gain of the first path 17 relative to the second path 19 is a range from about 10 dB to about 28 dB. A more preferred range is from about 14 dB to about 24 dB.

It is noted that the numbers 1, 2, 3 and 4 associated with the low-noise GaAs FET amplifier chips Q1, Q2 and Q1 indicate respective terminals of these chips in accord with usual commercial practice.

A power supply for positive DC voltage at a minimum of +5 Volts DC and capable of providing at least 100 milliamperes is connected at a terminal E1 which, for example, may be a solder pad. This DC voltage may be supplied by an external battery pack or by any convenient DC power supply, such as a car cigarette lighter socket adapter, a calculator battery eliminator, etc. A symmetrical power supply filter 38 is shown for smoothing the +5 V DC provided at the supply connections 40.

The inductor L7 is a wideband inductive choke having a specified impedance of about 600 Ohms at 50 MHz.

If special requirements might dictate, power may be fed into the cellular range extender through the RF output terminal J2 via an optional bias-tee utilizing an isolating inductor L8.

In summary, the present cellular range extender advantageously provides relatively high-gain, low-noise-figure amplification of inherently weaker reverse channel transmissions coming from cellular phone units and also provides relatively lower-gain, low-noise-figure amplification of inherently stronger forward channel transmissions coming from fixed base stations in a cellular network, thereby enhancing considerably a range over which a receiver connected to the output of the range extender can suitably receive both reverse and forward channel transmissions.

In the following Table are set forth examples of suitable commercially available items and suitable electrical parameters of components incorporated in the circuitry of the presently preferred embodiment of the cellular receiver range extender shown in FIGS. 2A, 2B and 2C.

In this table: "pF" means picoFarads; "nH" means nano-Henries; "µF" means microFarads; "1K Ohms" means 1,000 Ohms; "t" means turns; "#30" and "#28" mean American Wire Gauge wire sizes numbers 30 and 28; and "DIA." means the diameter in inches of axially-aligned, closely-spaced coils of wire forming an inductor.

TABLE

| Item or Component: | Parameter or Commercial Part Identification and Manufacturer: |
| --- | --- |
| C1, C5 | 1.7 pF |
| C2, C4 | 9.1 pF |
| C3 | 0.9 pF |
| C6, C13, C18 | 27 pF |
| C7, C15, C20 | 3.3 pF |
| C8, C14, C19 | 1,200 pF |
| C9, C10, C11, C12, C16, C17, C21, C26 | 100 pF |
| C22, C23 | 0.1 pF |
| C24, C25 | 100 µF, 20 volt rating |
| E1 | solder pad |
| BPF (references 18 & 22) | TT6P3-0836T-0250 from Alpha/Trans. Tech. |
| BPF (references 24 & 28) | TT6P3-0881T-0250 from Alpha/Trans. Tech. |
| J1, J2 | TNC Connector |
| L1 | 5 nH, comprising 2t at 0.075" DIA. of #30 |
| L2, L5, L6 | 15 nH, comprising 6t at 0.075" DIA. of #30 |
| L3, L4 | 3 nH, available as SI8800LPQ3.OY from Alpha/Trans. Tech. |
| L7 | 600 Ohms at 50 MHz, available as VK-20010-3B from Phillips |
| L8 | 150 nH, comprising 10t at 0.1" DIA. of #28 |
| Q1, Q2, Q1 | ATF-10135 from HP/Avantek |
| R1, R2, R3, R13, R14, R15 | 17.8 Ohms |
| R4, R5, R8, R9, R17, R18 | 51.1 Ohms |
| R6, R7, R16 | 1K Ohms |
| R10, R11 | 150 Ohms |
| R12 | 39 Ohms |

Since other changes and modifications varied to fit particular operating requirements and environments will become recognized by those skilled in the art, the invention is not considered limited to the examples chosen for purposes of illustration of a presently preferred embodiment of the invention, and includes all changes and modifications which do not constitute a departure from the true spirit and scope of this invention as claimed in the following claims and equivalents of the claimed elements.

I claim:

1. A cellular receiver range extender comprising:

an input terminal connectable to an antenna;

an output terminal connectable to a microwave radio receiver of cellular transmissions;

a bandpass preselector coupled to said input terminal;

said bandpass preselector having a passband covering the cellular band of 825 MHz to 890 MHz;

a low-noise preamplifier coupled to said bandpass preselector for amplifying RF signals which are within said passband;

a power divider coupled to said preamplifier for feeding amplified RF signals into first and second paths;

said first path including first bandpass filter means covering 825 MHz to 845 MHz and said second path including second bandpass filter means covering 870 MHz to 890 MHz;

said first path including amplification means connected to said first bandpass filter means and said second path including attenuation means connected to said second bandpass filter means;

a power combiner coupled to said first and second paths for recombining RF signals respectively travelling said first and second paths; and an output amplifier coupled between said power combiner and said output terminal.

2. A cellular receiver range extender as claimed in claim 1, in which:

said power divider is a resistive divider equally dividing signal power between respective RF signals being fed into said first and second paths.

3. A cellular receiver range extender as claimed in claim 2, in which:

said power combiner is a resistive combiner for combining respective RF signals being output from said first and second paths with equal attenuation of the respective RF signals.

4. A cellular receiver range extender as claimed in claim 3, in which:

said amplification means in said first path provide a gain in power of reverse channel signals which travel said first path;

said attenuation means in said second path provide a reduction in power of forward channel signals which travel said second path; and a difference in power level in dB between said gain in signal power in said first channel and said reduction in signal power in said second channel is within a range of about 10 dB to about 28 dB.

5. A cellular receiver range extender as claimed in claim 4, in which:

said difference in power level measured in dB between said gain in signal power of said reverse channel signals and said reduction in signal power of said forward channel signals is within a range of about 14 dB to about 24 dB.

6. A cellular receiver range extender as claimed in claim 1, in which:

said low-noise preamplifier, said amplification means in said first path and said output amplifier are identical.

7. A cellular receiver range extender as claimed in claim 1, in which:

said first bandpass filter means in said first path comprises first and second bandpass filters;

each of said first and second bandpass filters covers 825 MHz to 845 MHz;

said first bandpass filter precedes said amplification means and said second bandpass filter follows said amplification means;

said second bandpass filter means in said second path comprises third and fourth bandpass filters;

each of said third and fourth bandpass filters covers 870 MHz to 890 MHz; and said third bandpass filter precedes said attenuation means and said fourth bandpass filter means follows said attenuation means.

8. A cellular receiver range extender as claimed in claim 1, in which:

reverse channel signals at the output terminal are available having been amplified nominally about 20 dB relative to forward channel signals at the output terminal.

9. A cellular receiver range extender comprising:

an input terminal connectable to an antenna;

an output terminal of an output circuit;

said output terminal being connectable to a microwave radio receiver of cellular transmissions;

bandpass preselector means coupled to said input terminal having a passband covering 825 MHz to 890 MHz;

low-noise preamplifier means coupled to said bandpass preselector means for amplifying RF signals within said passband;

a power divider coupled to said preamplifier means;

said power divider feeding RF signals from said preamplifier means into first and second paths;

said first and second paths having first and second outputs, respectively;

said first path including in serial relationship first bandpass filter means, amplifier means and second bandpass filter means;

each of said first and second bandpass filter means covering 825 MHz to 845 MHz and said amplifier means amplifying RF signals within a frequency range covering 825 MHz to 845 MHz;

said second path including third and fourth bandpass filter means in circuit in serial relationship;

each of said third and fourth bandpass filter means covering 870 MHz to 890 MHz;

a power combiner connected from said first and second outputs of said first and second paths, respectively, to said output circuit; and amplifier means in said output circuit for amplifying RF signals within a passband covering 825 MHz to 890 MHz.

10. A cellular receiver range extender as claimed in claim 9, wherein:

said power divider equally divides signal power between RF signals being fed into said first and second paths.

11. A cellular receiver range extender as claimed in claim 10, wherein:

said first path provides a power gain for RF signals passing through said first path within a range of about 10 dB to about 28 dB relative to RF signals passing through said second path.

12. A cellular receiver range extender as claimed in claim 11, wherein:

said power combiner combines respective RF signals from said first and second outputs of said first and second paths, respectively, with equal effect on their respective power.

13. A cellular receiver range extender as claimed in claim 9, in which:

reverse channel signals at said output terminal are amplified in a range of about 14 dB to about 24 dB relative to forward channel signals at said output terminal.

14. A cellular receiver range extender comprising:

an input terminal for connection to an antenna;

an output terminal for connection to a microwave radio receiver of cellular transmissions;

bandpass preselector means in circuit with said antenna for passing cellular communications RF signals within a passband covering 825 MHz to 890 MHz;

preamplifier means in circuit with said bandpass preselector means for amplifying RF signals within said passband covering 825 MHz to 890 MHz;

circuit divider means in circuit with said preamplifier means for directing amplified signals from said preamplifier means into first and second paths;

said first path having first bandpass filter means for passing reverse channel cellular communication signals within a passband covering 825 MHz to 845 MHz;

said first path having amplification means for amplifying RF signals within said passband covering 825 MHz to 845 MHz;

said first path having an output;

said second path having second bandpass filter means for passing forward channel cellular communication signals within a passband covering 870 MHz to 890 MHz;

said second path having an output;

a combiner in circuit with said output of said first path and in circuit with said output of said second path for combining reverse channel signals which have passed through said first path with forward channel signals which have passed through said second path;

output amplifier means in circuit intermediate said combiner and said output terminal for amplifying and feeding to said output terminal reverse channel signals and forward channel signals which have passed through said combiner; and said reverse channel signals passing through said first path being increased in power at least ten times relative to said forward channel signals passing through said second path.

15. A cellular receiver range extender as claimed in claim 14, wherein:

said reverse channel signals passing through said first path are increased in power in a range of about 14 dB to about 24 dB relative to said forward channel signals passing through said second path.

16. A cellular receiver range extender as claimed in claim 14, wherein:

said reverse channel signals passing through said first path are increased by about 20 dB in power relative to said forward channel signals passing through said second path.

* * * * *